United States Patent
Lee

(10) Patent No.: US 11,614,886 B2
(45) Date of Patent: Mar. 28, 2023

(54) MEMORY SYSTEM AND OPERATING METHOD THEREOF

(71) Applicant: SK hynix Inc., Gyeonggi-do (KR)

(72) Inventor: Jae Il Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 29 days.

(21) Appl. No.: 17/244,276

(22) Filed: Apr. 29, 2021

(65) Prior Publication Data

US 2022/0164134 A1 May 26, 2022

(30) Foreign Application Priority Data

Nov. 23, 2020 (KR) .......................... 10-2020-0158131

(51) Int. Cl.
*G06F 3/06* (2006.01)

(52) U.S. Cl.
CPC ............ *G06F 3/0656* (2013.01); *G06F 3/064* (2013.01); *G06F 3/0619* (2013.01); *G06F 3/0653* (2013.01); *G06F 3/0659* (2013.01); *G06F 3/0679* (2013.01)

(58) Field of Classification Search
CPC ...... G06F 3/0656; G06F 3/0619; G06F 3/064; G06F 3/0653; G06F 3/0659; G06F 3/0679
USPC ...................................................... 711/154
See application file for complete search history.

(56) References Cited

U.S. PATENT DOCUMENTS

| | | | |
|---|---|---|---|
| 2016/0268000 A1* | 9/2016 | Thompson | G11C 16/20 |
| 2016/0284393 A1* | 9/2016 | Ramalingam | G11C 13/0069 |
| 2016/0322108 A1* | 11/2016 | Yang | G11C 16/10 |
| 2017/0068482 A1* | 3/2017 | Ramalingam | G06F 12/0804 |
| 2018/0129604 A1* | 5/2018 | Kim | G06F 12/0804 |
| 2019/0004947 A1* | 1/2019 | Trika | G06F 3/0647 |

FOREIGN PATENT DOCUMENTS

| | | |
|---|---|---|
| KR | 10-1342658 | 12/2013 |
| KR | 10-2015-0048426 | 5/2015 |
| KR | 10-2020-0001158 | 1/2020 |

* cited by examiner

*Primary Examiner* — Gautam Sain
(74) *Attorney, Agent, or Firm* — IP & T Group LLP

(57) ABSTRACT

A memory system may write, when operating in a force unit access mode, first write data requested by the host to a buffer for temporarily storing data to be written the memory device and a first memory block among the plurality of memory blocks, and may write, when the size of the data accumulatively stored in the buffer is greater than or equal to A which is a unit of a size in which data is written to a second memory block among the plurality of memory blocks, second write data of size A among the data stored in the buffer to the second memory block. The operation speed of the first memory block may be set faster than the operation speed of the second memory block and the storage capacity of the first memory block may be set smaller than the storage capacity of the second memory block.

9 Claims, 15 Drawing Sheets

MEMORY SYSTEM AND OPERATING METHOD THEREOF

CROSS-REFERENCE TO RELATED APPLICATION

The present application claims priority under 35 U.S.C. 119(a) to Korean patent application number 10-2020-0158131 filed on Nov. 23, 2020, which is incorporated herein by reference in its entirety.

BACKGROUND

1. Technical Field

The embodiments relate to a memory system and an operating method thereof.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

In general, when writing data to the memory device, the memory system may temporarily store data in an internal buffer, then send the write completion response to the host, and then write the data stored in the buffer to the memory device.

Alternatively, when writing data to the memory device, the memory system may also be operated in the force unit access (FUA) mode which is a mode in which the write completion response is transmitted to the host after completing the operation of writing the data onto the memory device.

SUMMARY

Various embodiments of the present disclosure may provide a memory system and an operating method thereof capable of improving the write performance and reducing the decrease of the life span due to the write when operating in the force unit access mode.

In addition, embodiments of the present disclosure may provide a storage system and an operating method thereof capable of preventing a problem due to the failure of the data write operation when a sudden power loss (SPL) occurs.

In one aspect, embodiments of the present disclosure may provide a memory system comprising a memory device including a plurality of memory blocks and a memory controller for communicating with the memory device and controlling the memory device.

The memory controller may write, when operating in a force unit access (FUA) mode, first write data requested by a host to a buffer for temporarily storing data, which is to be written in the memory device, and a first memory block among the plurality of memory blocks.

The memory controller may write, when the size of the data accumulatively stored in the buffer is greater than or equal to size A which is a unit size of which data is written to a second memory block at a time among the plurality of memory blocks, second write data of the size A among the data stored in the buffer to the second memory block.

The memory controller may control the memory device so that the operation speed of the first memory block is set faster than the operation speed of the second memory block and the storage capacity of the first memory block is set smaller than the storage capacity of the second memory block.

In another aspect, embodiments of the disclosure may provide an operating method of a memory system including a memory device with a plurality of memory blocks and a memory controller for communicating with the memory device and controlling the memory device.

The operating method of the memory system may include, when operating in a force unit access mode, writing the first write data requested by a host to a buffer for temporarily storing data, which is to be written in the memory device, and a first memory block among the plurality of memory blocks.

The operating method of the memory system may include, when the size of the data accumulatively stored in the buffer is greater than or equal to size A which is a unit size of which data is written to a second memory block at a time among the plurality of memory blocks, writing the second write data of the size A among the data stored in the buffer to the second memory block.

The operating method of the memory system may include controlling, by the memory controller, the memory device so that an operation speed of the first memory block may be set faster than the operation speed of the second memory block and the storage capacity of the first memory block may be set smaller than a storage capacity of the second memory block.

In another aspect, embodiments of the disclosure may provide a memory system including a nonvolatile storage including a lower level cell (LLC) block and a higher level cell (HLC) block, a volatile memory and a controller configured to control the nonvolatile storage and the volatile memory.

The controller may cache requested data into the volatile memory while storing the requested data into the LLC block in units of first sizes, in response to a request related to the requested data.

The controller may store, whenever the cached data becomes a second size or when the LLC block becomes full of data stored therein, the cached data into the HLC block in units of second sizes.

The controller may remove the requested data from the volatile memory and the LLC block when the requested data becomes stored in the HLC block from the volatile memory.

According to the embodiments of the disclosure, it is possible to improve the write performance and reduce the decrease of the life span due to the write operation when operating in the force unit access mode.

Furthermore, according to the embodiments of the disclosure, it is possible to prevent the problem due to the failure of the data write operation when a sudden power loss (SPL) occurs.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
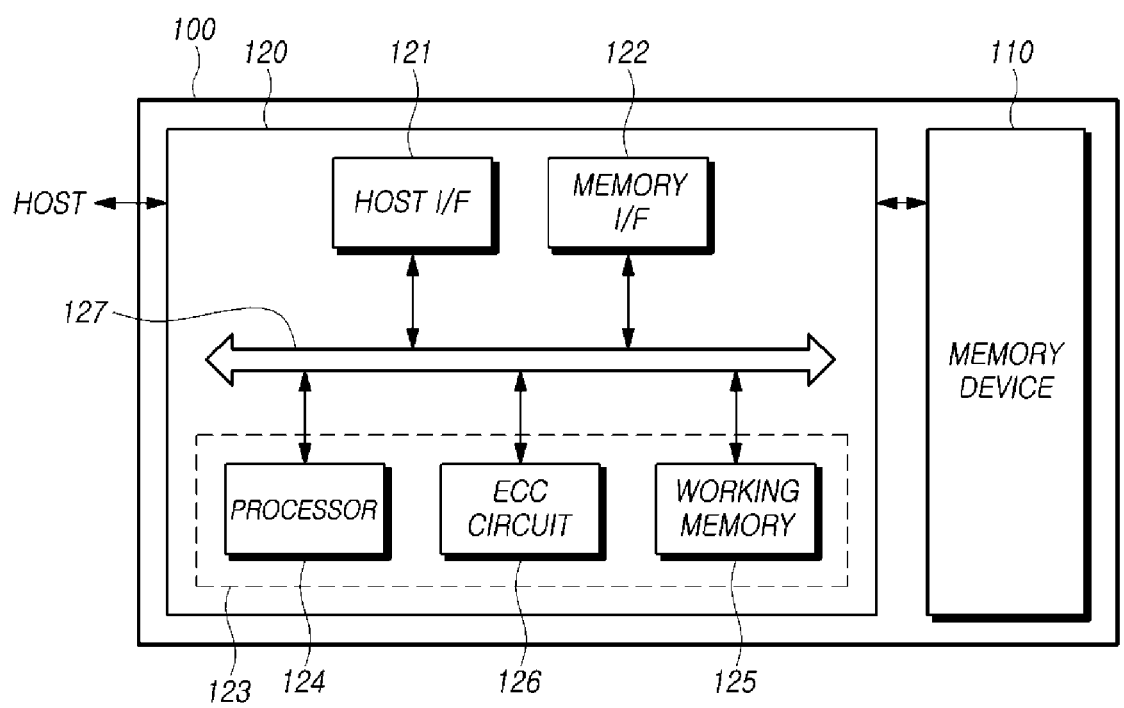
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of the elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
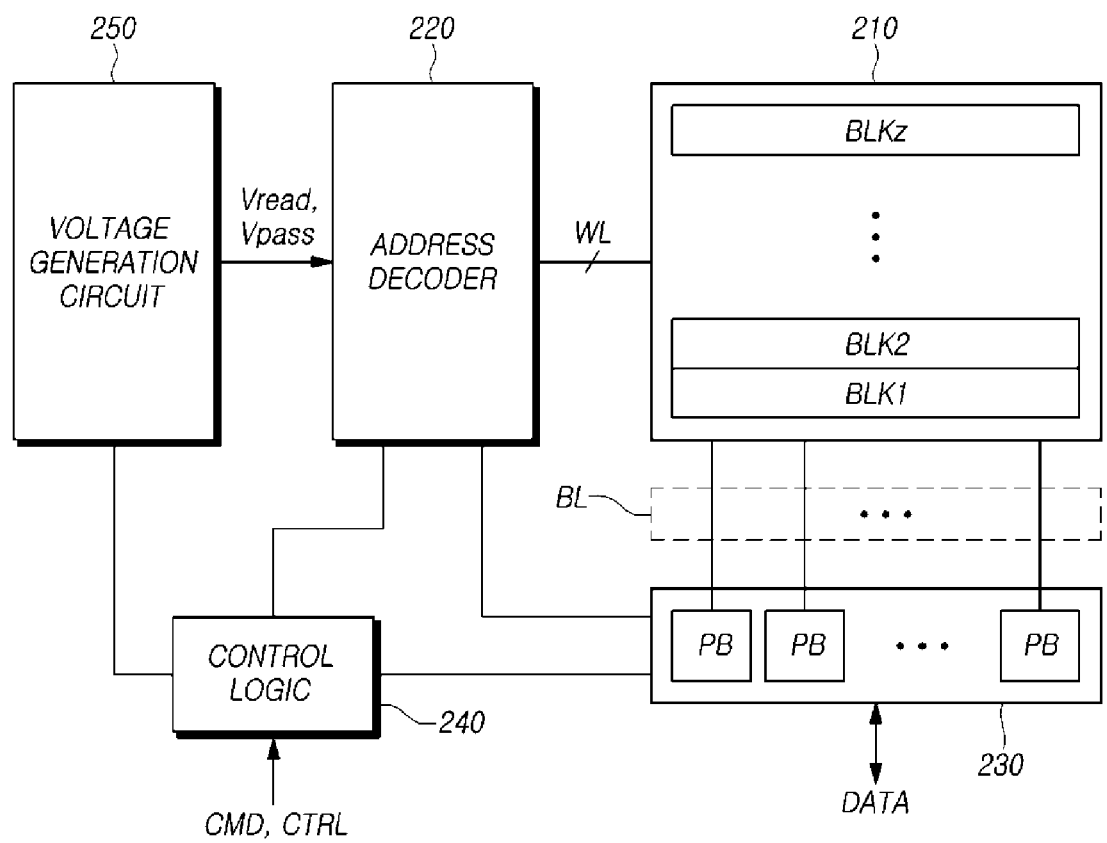
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
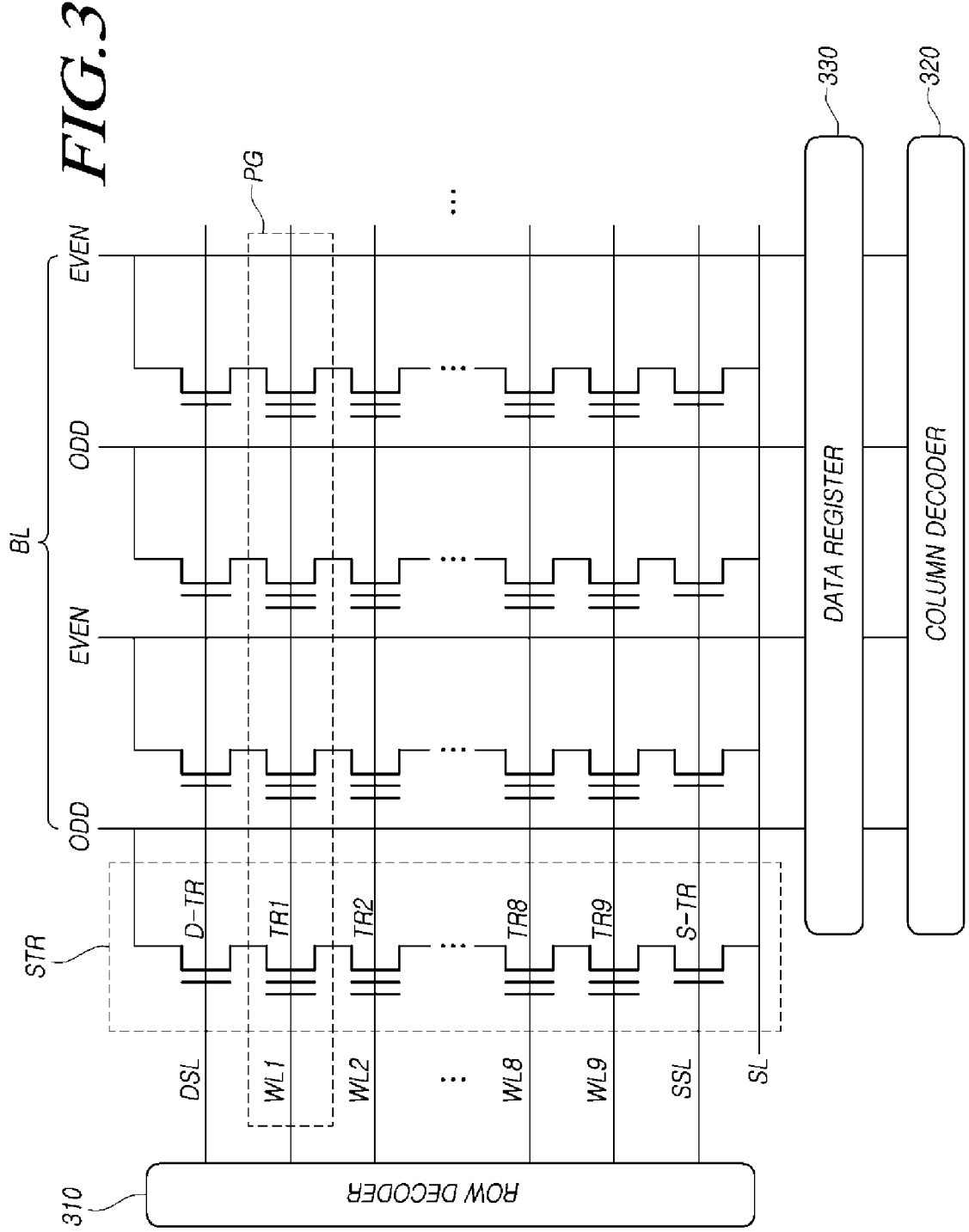
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
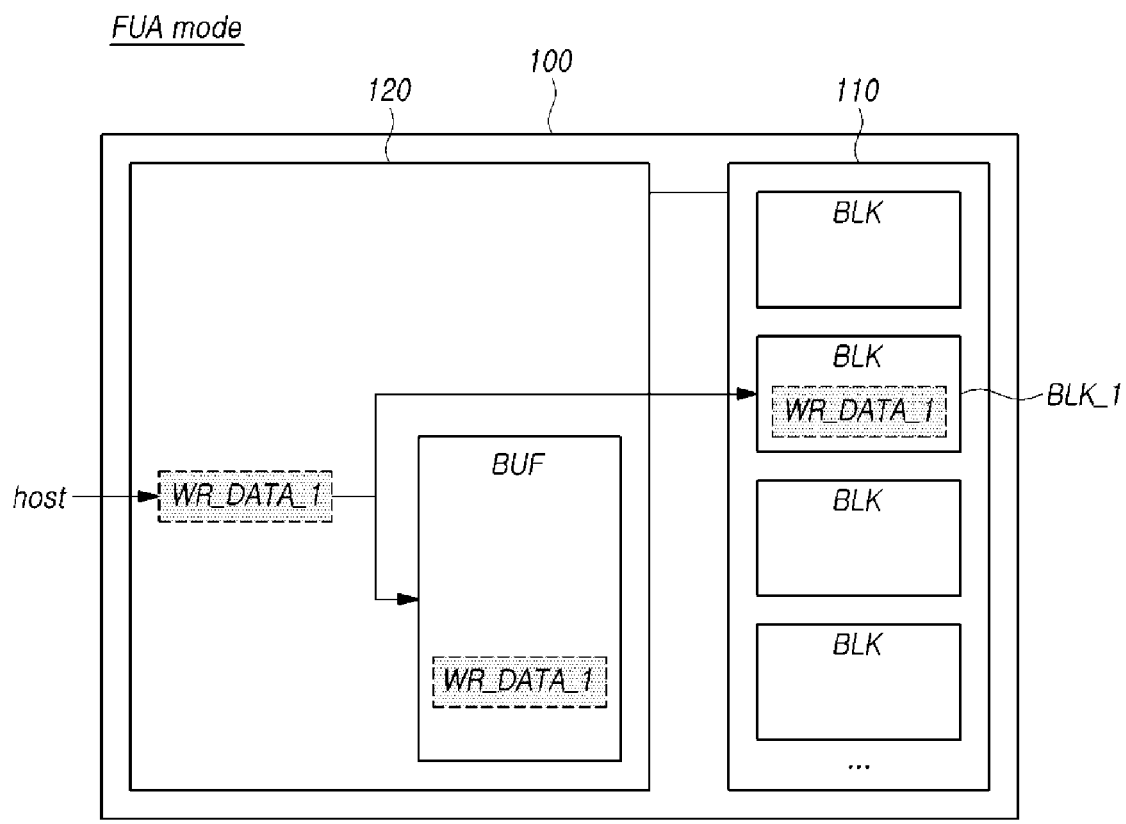
FIG. 4 is a diagram illustrating the operation of writing the first write data by the memory system according to embodiments of the present disclosure.

FIG. 4 is a diagram illustrating the operation of writing the first write data WR_DATA_1 by the memory system 100 according to embodiments of the present disclosure.

Referring to FIG. 4, the memory controller 120 of the memory system 100, when operating in the force unit access mode, may write the first write data WR_DATA_1, which is write-requested by the host, to the buffer BUF and the first memory block BLK_1 among the plurality of memory blocks BLK included in the memory device 110.

In this case, the buffer BUF may temporarily store data to be written to the memory device 110. The buffer BUF may be located on the working memory 125 or on a separate volatile memory (e.g., DRAM).

Even after the first write data WR_DATA_1 is written to the first memory block BLK_1, the first write data WR_DATA_1 stored in the buffer BUF may be retained in the buffer BUF until a preset condition is satisfied. Accordingly, when the host continuously requests a data write operation to the memory system 100, data written to the first memory block BLK_1 may be accumulated and stored in the buffer BUF.

Figure 5:
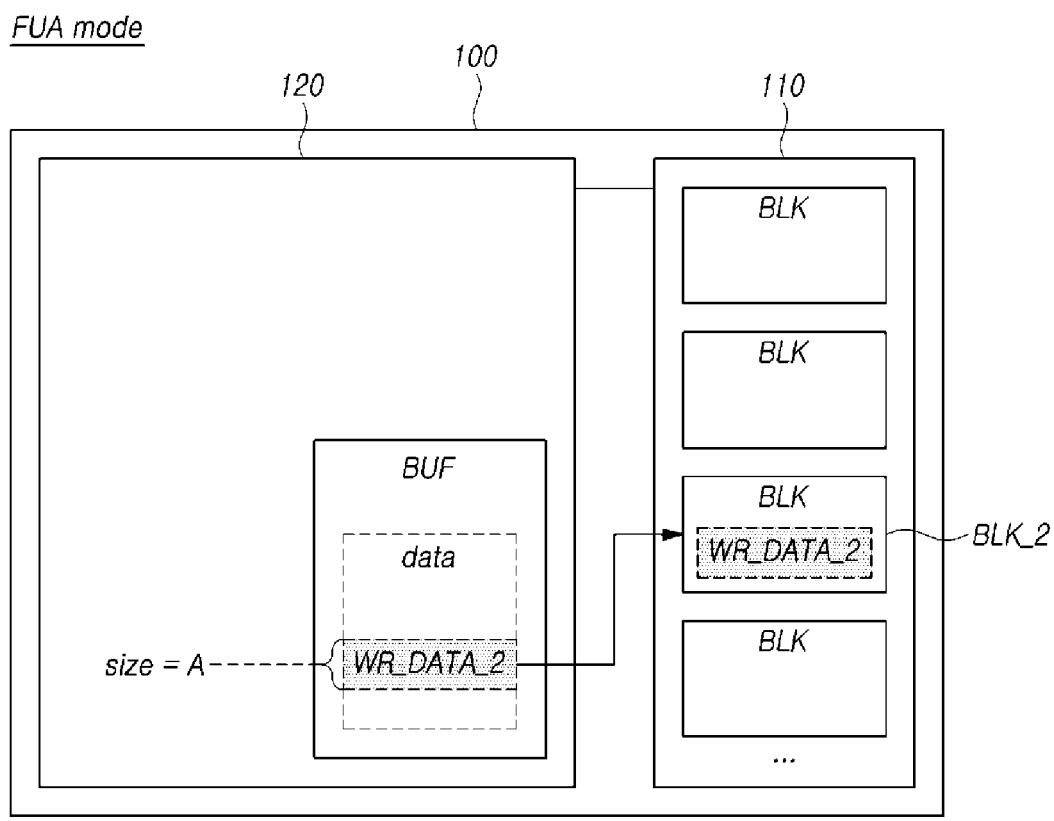
FIG. 5 is a diagram illustrating the operation of writing the second write data by the memory system according to embodiments of the present disclosure.

FIG. 5 is a diagram illustrating the operation of writing the second write data WR_DATA_2 by the memory system 100 according to embodiments of the present disclosure.

Referring to FIG. 5, The memory controller 120 of the memory system 100 may write, when the size of the data accumulatively stored in the buffer BUF is greater than or equal to a size A which is a unit size of which data is written to the second memory block BLK_2 at a time among the plurality of memory blocks BLK, the second write data WR_DATA_2 of the size A among the data stored in the buffer BUF is written to the second memory block BLK_2 among the plurality of memory blocks BLK included in the memory device 110.

After the operation of writing the second write data WR_DATA_2 to the second memory block BLK_2 is completed, the memory controller 120 may delete the second write data WR_DATA_2 from the buffer BUF without maintaining the second write data WR_DATA_2 in the buffer BUF. This is because since the second write data WR_DATA_2 is stored in the second memory block BLK_2, the corresponding data may not be lost even if the second write data WR_DATA_2 is deleted from the buffer BUF.

In various embodiments of the present disclosure, the memory controller 120 may control the memory device 100 so that the operation speed of the first memory block BLK_1 is set to be faster than the operation speed of the second memory block BLK_2 and the storage capacity of the first memory block BLK_1 is set to be smaller than the storage capacity of the second memory block BLK_2.

Therefore, when the host requests data to be written in the memory device 110, the memory controller 120 can rapidly write data to be written to the first memory block BLK_1, thereby reducing latency to the host and improving write performance.

Furthermore, the memory controller 120 may store data in the second memory block BLK_2 having a large storage capacity, thereby effectively utilizing the storage space of the memory device 110. As a result, it is possible to reduce the decrease in the lifespan of the memory system 100 due to the data write operation.

As an example, the memory controller 120 may control the memory device 110 such that the first memory block BLK_1 is set as the SLC memory block and the second memory block BLK_2 is set as the TLC memory block. In this case, since the memory cells included in the first memory block BLK_1 are SLC, they can operate faster than the second memory block BLK_2 including the TLC memory cells, but the storage capacity thereof is smaller than that of the second memory block BLK_2.

The memory controller 120 of the memory system 100 may dynamically select the first memory block BLK_1 from among the plurality of memory blocks BLK according to a specific reference. For example, the memory controller 120 may select the first memory block BLK_1 based on the total bytes written (TBW) to the memory system 100 and the program/erase cycle (P/E cycle) of each of the plurality of memory blocks BLK.

Specifically, the total bytes written (TBW) corresponds with the product of the total storage capacity (that is, the total storage capacity of the plurality of memory blocks BLK) of the memory device 100 in the memory system 100 and the program/erase cycle for each memory block. Since the total storage capacity of the memory device 110 is predetermined, it is necessary to determine the value of the program/erase cycle (P/E cycle) for preventing the total bytes written (TBW) from exceeding a specific threshold value. Accordingly, the memory controller 120 may select the first memory block BLK_1 from the memory block whose program/erase count is less than or equal to the value of the predetermined program/erase cycle (P/E cycle) among a plurality of memory blocks BLK.

After selecting the first memory block BLK_1, the memory controller 120 may store information on which memory block is selected as the first memory block BLK_1 from the plurality of memory blocks BLK in the memory device 110.

In the above, the overall operation of the memory system 100 according to embodiments of the present disclosure has been described.

Hereinafter, it will be described an example of the operation in which the memory system 100 writes data received from the host to the first memory block BLK_1 or the second memory block BLK_2 with reference to FIGS. 6 to 7. In this case, the host requests the memory system 100 to write data by 4 KB at a time.

Figure 6:
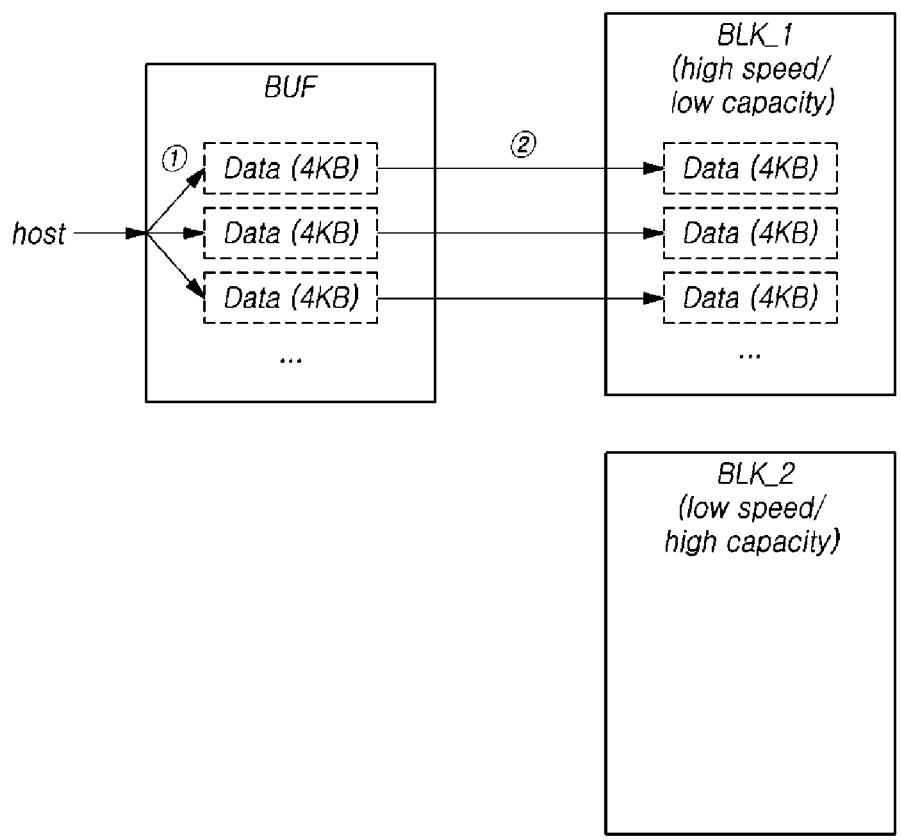
FIG. 6 is a diagram illustrating the operation of writing the data received from the host to the first memory block by the memory system according to embodiments of the present disclosure.

FIG. 6 is a diagram illustrating the operation of writing the data received from the host to the first memory block BLK_1 by the memory system 100 according to embodiments of the present disclosure.

Referring to FIG. 6, when the host requests to write 4 KB of data, the memory controller 120 of the memory system 100 may write 4 KB of data to the buffer BUF (①) and may write 4 KB of data to the first memory block BLK_1 (②). When such a process is repeated, the write-requested data may be accumulated and stored in the buffer BUF and simultaneously stored in the first memory block BLK_1.

Figure 7:
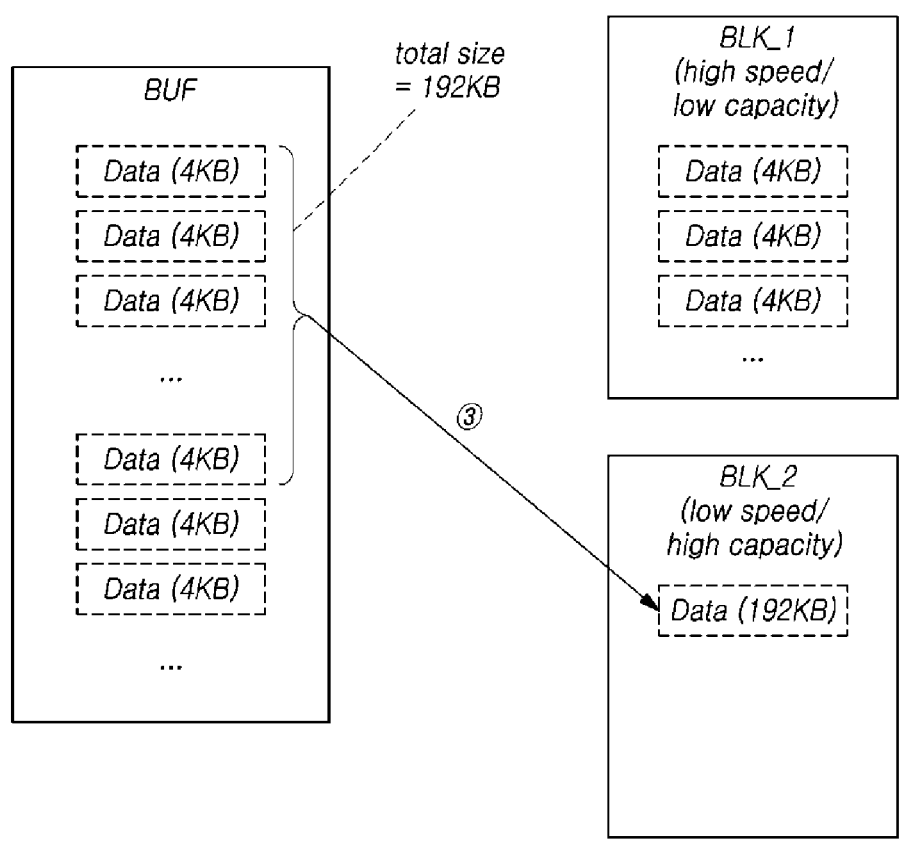
FIG. 7 is a diagram illustrating the operation of writing the data stored in the buffer to the second memory block by the memory system according to embodiments of the present disclosure.

FIG. 7 is a diagram illustrating the operation of writing the data stored in the buffer BUF to the second memory block BLK_2 by the memory system 100 according to embodiments of the present disclosure.

In FIG. 7, the size A, which is a unit size of which data is written to the second memory block BLK_2 at a time, is 192 KB, and a total of 192 KB or more of data is accumulatively stored in the buffer BUF. In this case, the memory controller 120 of the memory system 100 may write the total of 192 KB of data stored in the buffer BUF to the second memory block BLK_2 (③).

As described above, a reason why the memory system 100 first writes data to the first memory block BLK_1 and then writes the accumulated data back to the second memory block BLK_2 at once is as follows.

First, the size of write-requested data is generally smaller than the size A, which is the unit size of which data is written the second memory block BLK_2 at a time. Therefore, in order for the memory system 100 to write the write-requested data to the second memory block BLK_2, it is required to wait until data which is accumulated in the buffer BUF becomes the size A, or add dummy data to the write-requested data so that a sum of the write-requested data and the dummy data becomes the size A.

If the memory system 100 waits until the data which is accumulated becomes the size A in the buffer BUF, providing a write completion message to the host in response to a write-request of the host for under-sized data which is less than the size A may be late since the message should be provided after the write-requested data is written to the second memory block BLK_2 in the FUA mode, and thus there may occur a problem of deteriorating the quality of service (QoS) for the host.

If the dummy data is added, there may be a problem that the storage space of the second memory block BLK_2 is inefficiently used due to the dummy data.

Therefore, according to the embodiments of the present disclosure, the memory system 100 may first write data to the first memory block BLK_1 having the fast operation speed to quickly respond the write completion message to the host. If data is accumulated thereafter, the accumulatively buffered data may be written to the second memory block BLK_2 having a large storage capacity to efficiently store data.

In the above, the operation in which the memory system 100 stores write-requested data in the memory device 110 when operating in the force unit access mode has been described.

This operation may be performed when the memory system 100 is in the force unit access mode. Hereinafter, the condition in which the memory system 100 enters the force unit is access mode will be described.

For example, when receiving a message requesting to enter the force unit access mode from the host, the memory system 100 may enter the force unit access mode.

As another example, the memory system 100 may internally determine whether to operate in the force unit access mode without the intervention of the host. Hereinafter, this will be described in detail in FIGS. 8 to 9.

Figure 8:
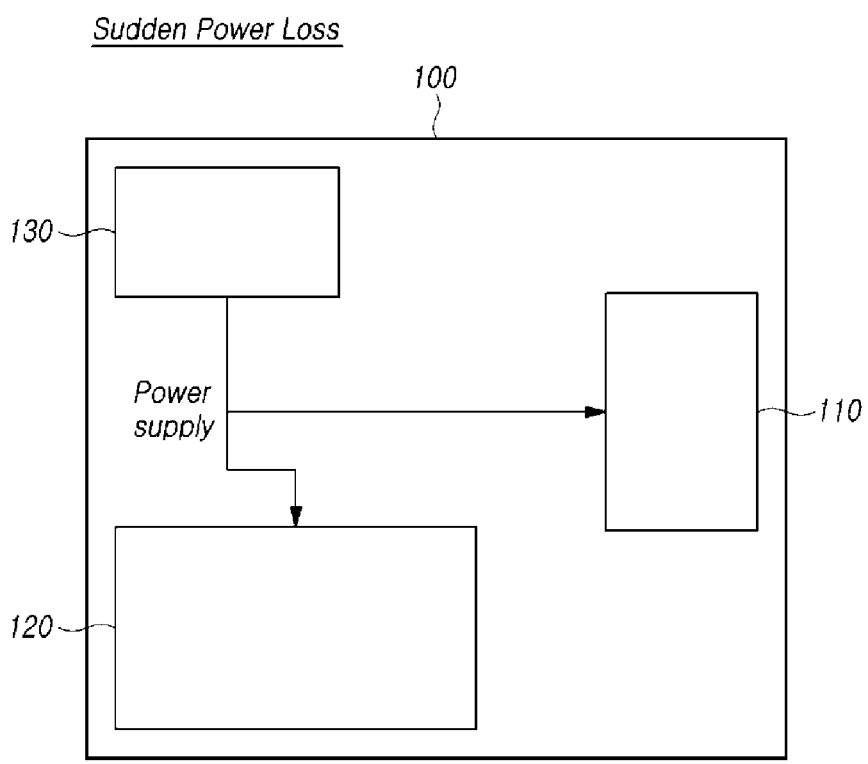
FIG. 8 is a diagram illustrating a case in which the memory system according to embodiments of the present disclosure further includes the auxiliary built-in power unit.

FIG. 8 is a diagram illustrating a case in which the memory system 100 according to embodiments of the present disclosure further includes the auxiliary built-in power unit 130.

In FIG. 8, the memory system 100 may further include the auxiliary built-in power unit 130 in addition to the memory device 110 and the memory controller 120. In addition, the memory controller 120 may monitor the charging time for charging the auxiliary built-in power unit 130 and determine whether to operate in the force unit access mode based on the charging time of the auxiliary built-in power unit 130.

The auxiliary built-in power unit 130 may charge power while power is normally supplied to the memory system 100 from the outside of the memory system 100. In addition, the auxiliary built-in power unit 130 may supply power to the memory system 100 when a sudden power loss (SPL) occurs, thereby preventing a problem that occurs when the memory system 100 is abnormally terminated and is capable of performing a preparatory operation to allow the memory system 100 to be restored to a state prior to the occurrence of the SPL when the memory system 100 is subsequently powered on. To this end, the auxiliary built-in power unit 130 may supply power to the memory device 110 and the memory controller 120 of the memory system 100.

The auxiliary built-in power unit 130 may include a capacitor or a chemical battery for charging power. In this case, the capacitor may be a ceramic capacitor, a multilayer ceramic capacitor, a high dielectric constant capacitor, an electrolytic capacitor, or a tantalum polymer capacitor like POSCAP.

Figure 9:
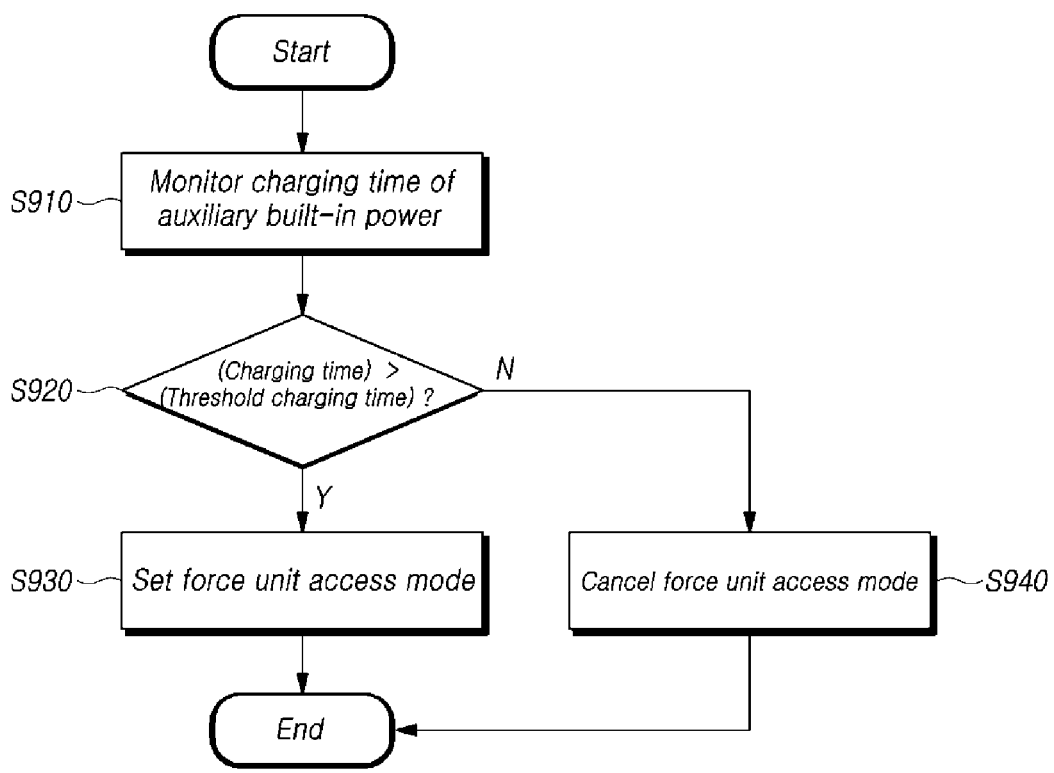
FIG. 9 is a flowchart for determining whether the memory system of FIG. 8 operates in the force unit access mode.

FIG. 9 is a flowchart for determining whether the memory system 100 of FIG. 8 operates in the force unit access mode.

Referring to FIG. 9, the memory controller 120 of the memory system 100 may monitor the charging time for charging power to the auxiliary built-in power unit 130 (S910). For example, the memory controller 120 may monitor the charging time of the auxiliary built-in power unit 130 whenever the memory system 100 is booted or every preset period (e.g. 24 h).

Further, the memory controller 120 may determine whether the charging time of the auxiliary built-in power unit 130 exceeds a specific threshold charging time (S920).

If the charging time of the auxiliary built-in power unit 130 exceeds the threshold charging time (S920-Y), the memory controller 120 may set the force unit access mode (S930).

If the charging time of the auxiliary built-in power unit 130 exceeds the preset threshold charging time, there may be a high possibility that there is a defect in the auxiliary built-in power unit 130, and therefore, there may be a high possibility that the auxiliary built-in power unit 130 may not normally supply power to the memory system 100 during the SPL. In this case, there may be a possibility that the memory system 100 fails to store data accumulated in the buffer BUF in the memory device 110 after the SPL occurs. To prevent potential issues, the memory system 100 may operate in the force unit access mode and transmit the write completion response to the host only for data which has been completely written to the memory device 110, thereby preventing the problem of the host receiving a write completion response for data for which the write failed.

On the other hand, in the case that the charging time of the auxiliary built-in power unit 130 is less than or equal to the threshold charging time (S920-N), the memory controller 120 may cancel the force unit access mode (S940). In this case, even if a SPL occurs, the memory system 100 may store data accumulated in the buffer BUF in the memory device 110 while power is supplied by the auxiliary built-in power unit 130.

In the above, an example of a condition in which the memory system 100 enters the force unit access mode has been described.

Hereinafter, the operation in which the memory controller 120 of the memory system 100 writes write-requested data to the memory device 110 will be described.

The size of the write-requested data is variable, however, the size B of which data is to be written to the first memory block BLK_1 of the memory device 110 at a time may be fixed. For example, the size B may be the size of a page included in the first memory block BLK_1 or a multiple of the size of the page. Moreover, the size B is smaller than the size A described above in FIG. 5 (e.g., the size B=16 KB, the size A=192 KB).

When the memory controller 120 writes the aforementioned first write data WR_DATA_1 to the first memory block BLK_1, the size of the first write data WR_DATA_1 may be less than the size B. In this case, the memory controller 120 may write the first write data WR_DATA_1 to the first memory block BLK_1 together with dummy data, of which a size is equal to a difference between the size B and the size of the first write data WR_DATA_1, so that data of the size B may be written to the first memory block BLK_1 at a time. This will be described in detail in FIG. 10.

Figure 10:
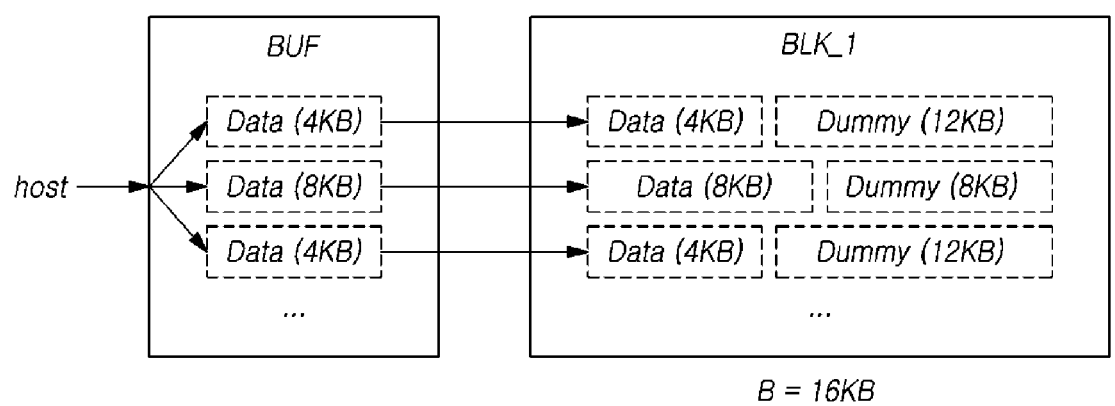
FIG. 10 is a diagram illustrating the operation of writing the data to a first memory block together with dummy data by the memory system according to embodiments of the present disclosure.

FIG. 10 is a diagram illustrating the operation of writing the data to the first memory block BLK_1 together with dummy data by the memory system 100 according to embodiments of the present disclosure.

In FIG. 10, the size B is 16 KB, and the host requests to write 4 KB or 8 KB of data.

In the case that the host requests to write 4 KB of data, the memory controller 120 of the memory system 100 may write the dummy data of (16 KB−4 KB)=12 KB together in the first memory block BLK_1 in order to write 16 KB of data to the first memory block BLK_1 at a time.

In the case that the host requests to write 8 KB of data, the memory controller 120 of the memory system 100 may write the dummy data of (16 KB−8 KB)=8 KB together in the first memory block BLK_1 in order to write 16 KB of data to the first memory block BLK_1 at a time.

Figure 11:
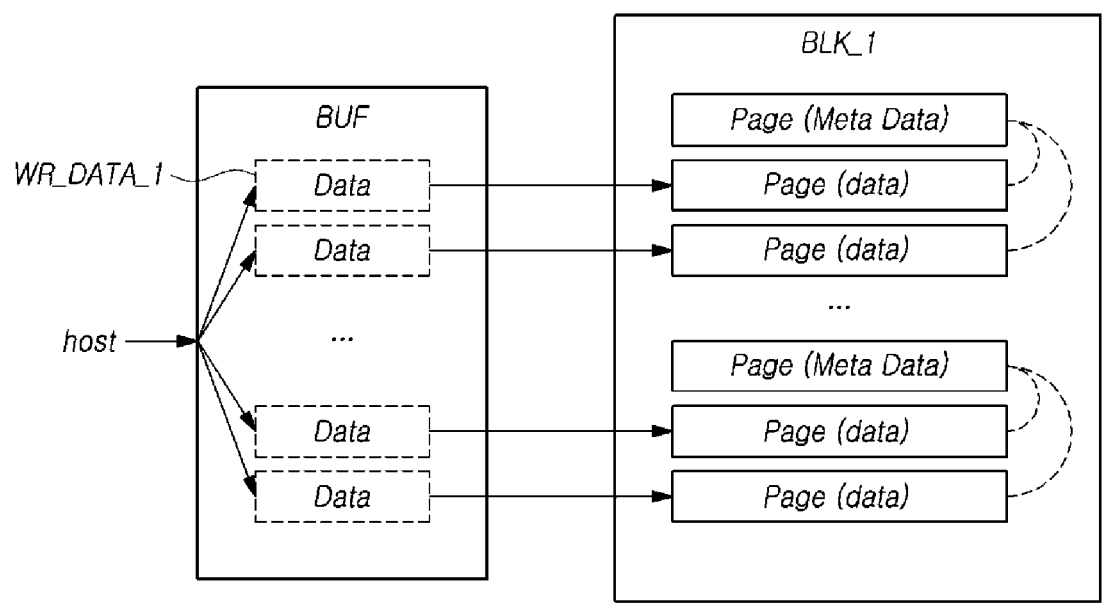
FIG. 11 is a diagram illustrating the data and meta data stored in the first memory block according to embodiments of the present disclosure.

FIG. 11 is a diagram illustrating the data and meta data stored in the first memory block BLK_1 according to embodiments of the present disclosure.

Referring to FIG. 11, the memory controller 120 of the memory system 100 may first write meta data corresponding to the data to the first memory block BLK_1 before writing the data received from the host to the first memory block BLK_1. For example, when the memory controller 120 writes the first write data WR_DATA_1 to the first memory block BLK_1, the memory controller 120 may first generate meta data corresponding to the first write data WR_DATA_1, write the meta data to the first memory block BLK_1, and then write the first write data WR_DATA_1.

Accordingly, after a SPL occurs, the memory controller 120 may perform a recovery operation for the SPL by checking meta data corresponding to the data stored in the first memory block BLK_1 when powering on.

As described above, data written to the first memory block BLK_1 may be accumulated and stored in the buffer BUF, and data accumulatively stored in the buffer BUF may be written to the second memory block BLK_2 thereafter. In this case, since the memory system 100 does not need to repeatedly store data written to the second memory block BLK_2 in the first memory block BLK_1, the first memory block BLK_1 may be erased. Hereinafter, this will be described in detail in FIGS. 12 to 13.

Figure 12:
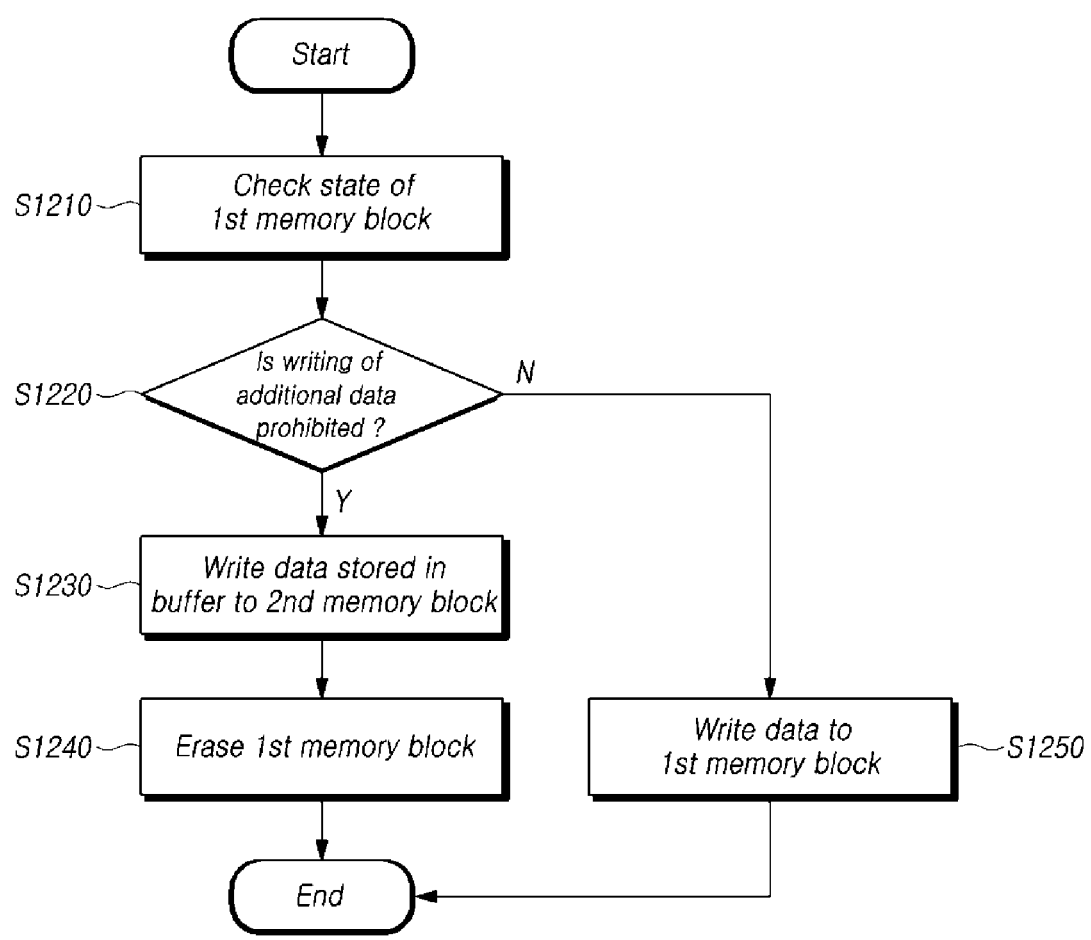
FIG. 12 is a flowchart illustrating the operation of erasing the first memory block according to a state of the first memory block by the memory system according to embodiments of the present disclosure.

FIG. 12 is a flowchart illustrating the operation of erasing the first memory block BLK_1 according to a state of the first memory block BLK_1 by the memory system 100 according to embodiments of the present disclosure.

Referring to FIG. 12, the memory controller 120 of the memory system 100 may check the state of the first memory block BLK_1 before storing data in the first memory block BLK_1 (S1210).

In addition, the memory controller 120 may determine whether writing of additional data to the first memory block BLK_1 is prohibited (S1220). The state in which writing additional data to the first memory block BLK_1 is prohibited may mean a state in which the memory device 110 does not allow data to be written to the first memory block BLK_1.

As an example, if there is no page to which new data can be written among the pages included in the first memory block BLK_1, the memory controller 120 may determine that the write of additional data to the first memory block BLK_1 is prohibited. For example, the first memory block BLK_1 may become prohibited when the first memory block BLK_1 becomes full of data stored therein.

If the write of additional data to the memory block BLK_1 is prohibited (S1220-Y), the memory controller 120 may first write the data stored in the buffer BUF in the second memory block BLK_2 (S1230). In addition, the memory controller 120 may erase the first memory block BLK_1 (S1240). In an embodiment, the erased first memory block BLK_1 may become available for storing data.

On the other hand, when additional data is allowed to be written to the memory block BLK_1 (S1220-N), the memory controller 120 may write data to the first memory block BLK_1 (S1250).

Figure 13:
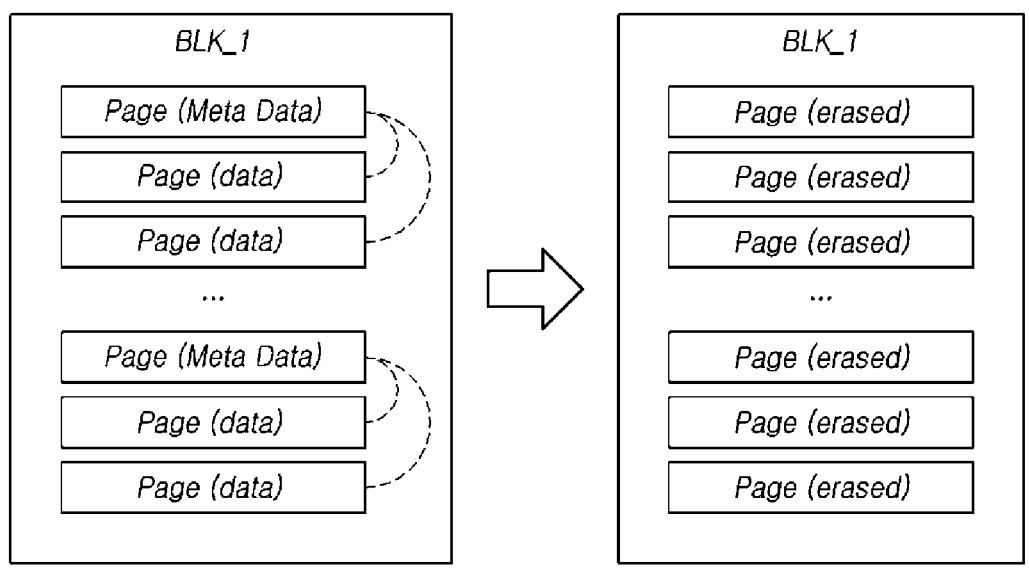
FIG. 13 is a diagram illustrating the comparison of states before and after erasing of the first memory block.

FIG. 13 is a diagram illustrating the comparison of states before and after erasing of the first memory block BLK_1.

Referring to FIG. 13, each page included in the first memory block BLK_1 may store write-requested data or meta data corresponding to the data.

When the first memory block BLK_1 is erased, all pages included in the first memory block BLK_1 are in the erased state. The erased first memory block BLK_1 may be used for other purposes (e.g. temporarily storing data to be migrated to another memory block or saving new write data received from the host).

Figure 14:
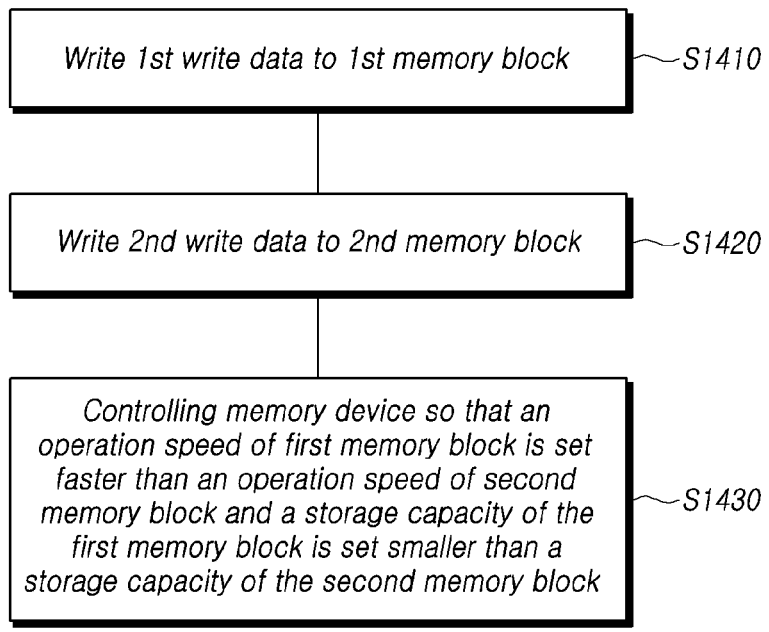
FIG. 14 is a diagram illustrating the operating method of the memory system according to embodiments of the present disclosure.

FIG. 14 is a diagram illustrating the operating method of the memory system 100 according to embodiments of the present disclosure.

Referring to FIG. 14, the operating method of the memory system 100 may include writing, when operating in a force unit access mode, the first write data WR_DATA_1 requested to be written by the host to the buffer BUF for temporarily storing data, which is to be written in the memory device 110, and the first memory block BLK_1 among the plurality of memory blocks BLK included in the memory device 110 (S1410).

In the operation S1410, when the size of the first write data WR_DATA_1 is less than the size B which is a unit size of which data is written to the first memory block at a time, the memory controller may write the first write data WR_DATA_1 to the first memory block BLK_1 together with dummy data, of which the size is equal to a difference between the size B and the size of the first write data WR_DATA_1.

In addition, the operating method of the memory system 100 may include writing, when the size of the data accumulatively stored in the buffer BUF is greater than or equal to the size A which is a unit size of which data is written to the second memory block BLK_2 at a time among the plurality of memory blocks BLK, the second write data of the size A among the data stored in the buffer BUF is written to the second memory block BLK_2 among the plurality of memory blocks BLK (S1420).

In addition, the operating method of the memory system 100 may include controlling, by the memory controller 120, the memory device 110 so that the operation speed of the first memory block BLK_1 may be set to be faster than the operation speed of the second memory block BLK_2 and the storage capacity of the first memory block BLK_1 may be set to be smaller than the storage capacity of the second memory block BLK_2 (S1430).

Furthermore, the operating method of the memory system 100 may include monitoring the charging time of the auxiliary built-in power unit 130 for supplying power to the memory device 110 and the memory controller 130 when the sudden power loss (SPL) occurs, and determining whether to operate in the force unit access mode based on the charging time of the auxiliary built-in power unit 130.

In addition, the operating method of the memory system 100 may include erasing, when writing additional data to the first memory block BLK_1 is prohibited, the first memory block BLK_1 after writing the data stored in the buffer BUF to the second memory block BLK_2.

In some implementations, the operation of the memory controller 120 described above may be controlled by the control circuit 123, and may be performed in such a manner that the processor 124 executes (drives) firmware in which the overall operation of the memory controller 120 is programmed.

Figure 15:
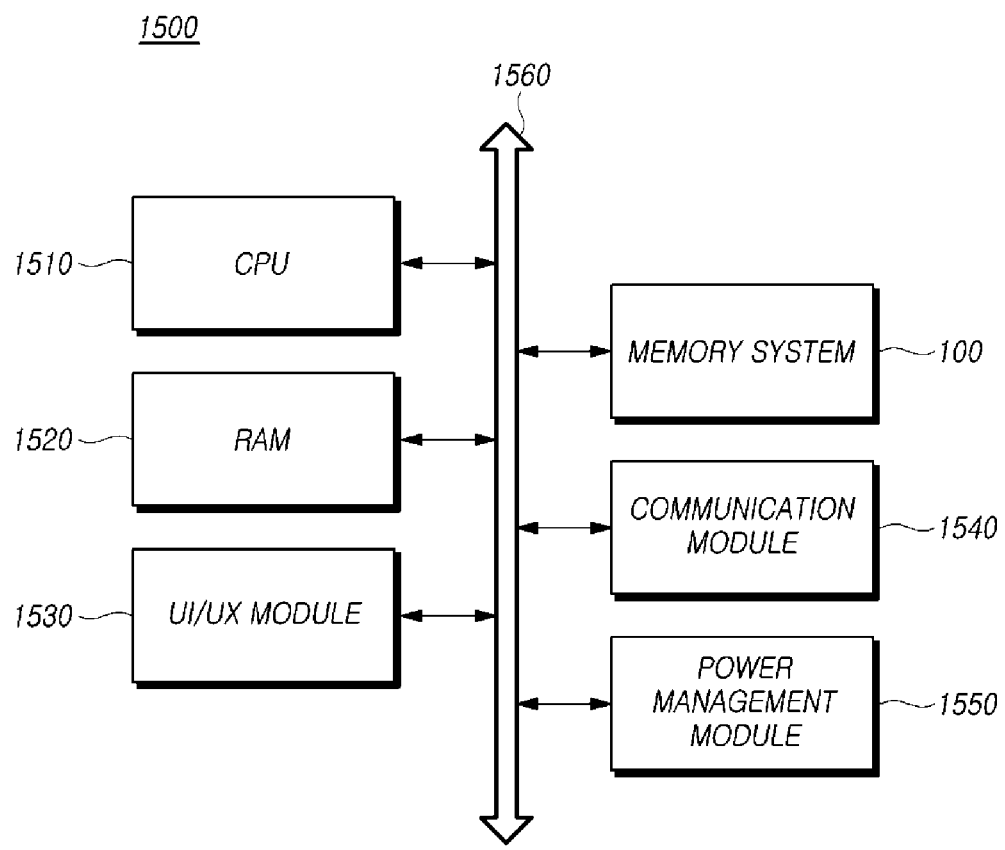
FIG. 15 is a diagram illustrating the configuration of a computing system based on some embodiments of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system comprising:
a memory device including a plurality of memory blocks; and
a memory controller for communicating with the memory device and controlling the memory device,
wherein the memory controller:
writes, when operating in a force unit access (FUA) mode, first write data requested to be written by a host to a buffer in the memory controller for temporarily storing data, which is to be written in the memory device, and a first memory block among the plurality of memory blocks,
writes, when the size of the data accumulatively stored in the buffer is greater than or equal to a size A which is a unit size of which data is written to a second memory block at a time among the plurality of memory blocks, second write data of the size A among the data stored in the buffer to the second memory block, and
controls the memory device so that an operation speed of the first memory block is set faster than an operation speed of the second memory block and a storage capacity of the first memory block is set smaller than a storage capacity of the second memory block,
wherein, when writing additional data to the first memory block is prohibited, the memory controller erases the first memory block after writing the data stored in the buffer to the second memory block.

2. The memory system of claim 1, wherein the memory controller controls the memory device so that the first memory block is set as a single-level cell (SLC) memory block and the second memory block is set as a triple-level cell (TLC) memory block.

3. The memory system of claim 1,
further comprising an auxiliary built-in power unit for supplying power to the memory device and the memory controller when a sudden power loss (SPL) occurs,
wherein the memory controller monitors a charging time of the auxiliary built-in power unit and determines whether to operate in the force unit access mode based on the charging time of the auxiliary built-in power unit.

4. The memory system of claim 3, wherein the memory controller monitors the charging time of the auxiliary built-in power unit at a time point when the memory system is booted or at every preset monitoring period.

5. The memory system of claim 1, wherein, when the size of the first write data is less than a size B which is a unit size of which data is written to the first memory block at a time, the memory controller writes the first write data to the first memory block together with dummy data equal to a difference between the size B and the size of the first write data.

6. The memory system of claim 1, wherein the memory controller first writes meta data corresponding to the first write data to the first memory block before writing the first write data to the first memory block.

7. An operating method of a memory system including a memory device with a plurality of memory blocks and a memory controller for communicating with the memory device and controlling the memory device comprising:
writing, by the memory controller, when operating in a force unit access (FUA) mode, first write data requested to be written by a host to a buffer in the memory controller for temporarily storing data, which is to be written in the memory device, and a first memory block among the plurality of memory blocks;
writing, by the memory controller, when the size of the data accumulatively stored in the buffer is greater than or equal to a size A which is a unit size of which data is written to a second memory block at a time among the plurality of memory blocks, second write data of the size A among the data stored in the buffer to the second memory block; and
controlling, by the memory controller, the memory device so that an operation speed of the first memory block is set faster than an operation speed of the second memory block and a storage capacity of the first memory block is set smaller than a storage capacity of the second memory block,
wherein, in response to writing additional data to the first memory block being prohibited, erasing, by the memory controller, the first memory block after writing the data stored in the buffer to the second memory block.

8. The operating method of claim 7, further comprising:
monitoring, by the memory controller, a charging time of an auxiliary built-in power unit for supplying power to the memory device and the memory controller when a sudden power loss (SPL) occurs; and
determining, by the memory controller, whether to operate in the force unit access mode based on the charging time of the auxiliary built-in power unit.

9. The operating method of claim 7, wherein the writing of the first write data to the buffer and the first memory block comprises writing, when the size of the first write data is less than a size B which is a unit size of which data is written to the first memory block at a time, the first write data to the first memory block together with dummy data equal to a difference between the size B and the size of the first write data.

* * * * *